United States Patent
Wroblewski

(10) Patent No.: US 10,860,625 B2
(45) Date of Patent: Dec. 8, 2020

(54) METHOD FOR SEMANTIC INDEXING OF BIG DATA USING A MULTIDIMENSIONAL, HIERARCHICAL SCHEME

(71) Applicant: SPAWAR Systems Center Pacific, San Diego, CA (US)

(72) Inventor: Ronald John Wroblewski, San Diego, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 468 days.

(21) Appl. No.: 14/861,965

(22) Filed: Sep. 22, 2015

(65) Prior Publication Data

US 2017/0017715 A1  Jan. 19, 2017

Related U.S. Application Data

(60) Provisional application No. 62/193,763, filed on Jul. 17, 2015.

(51) Int. Cl.
*G06F 16/31* (2019.01)
*G06F 16/28* (2019.01)

(52) U.S. Cl.
CPC .......... *G06F 16/316* (2019.01); *G06F 16/283* (2019.01)

(58) Field of Classification Search
CPC ......... G06F 17/30867; G06F 17/30734; G06F 17/30864; G06F 17/3087; G06F 17/30722; G06F 17/30017; G06F 17/3002; G06F 17/30029; G06F 17/30038; G06F 17/30619; G06F 17/30707; G06F 17/30286; G06F 17/303; G06F 17/30321; G06F 17/30584; G06F 17/3061; G06F 17/30705; G06F 17/30943; G06F 17/3071; G06F 17/30495; G06F 17/30592; G06F 17/30985; G06F 16/283; G06F 16/316; G06F 16/22;
(Continued)

(56) References Cited

U.S. PATENT DOCUMENTS 6,460,026 B1 * 10/2002 Pasumansky ......... G06F 16/283
707/737
6,636,847 B1  10/2003 Spires
(Continued)

OTHER PUBLICATIONS

Lawder, J. K., The Application of Space-Filling Curves to the Storage and Retrieval of Multi-Dimensional Data, Ph.D. thesis, School of Computer Science and Information Systems, Birkbeck College, University of London, 2000.
(Continued)

*Primary Examiner* — Alford W Kindred
*Assistant Examiner* — Cecile H Vo
(74) *Attorney, Agent, or Firm* — Naval Information Warfare Center Pacific; Kyle Eppele; J. Eric Anderson

(57) ABSTRACT

A method for indexing semantic, non-transitory, computer-stored data comprising the following steps: storing the data in a database; representing the data in a structured framework having at least three elements derived from an ontology; expressing each element as a hierarchical-index value based on an ontology such that semantic information is embedded therein; combining the elements in a multi-dimensional index; and converting the multi-dimensional index into a one-dimensional index.

6 Claims, 3 Drawing Sheets

(58) Field of Classification Search
CPC ............... G06F 16/2264; G06F 16/185; G06F 16/2228; G06F 16/28; G06F 16/322; G06F 40/30; G06F 16/282; G06F 16/31; G06F 16/51
USPC .................. 707/E17.089, 737, 999.003, 708, 707/E17.108, 706, 736, E17.002, 707/E17.008, E17.014, E17.069, E17.074, 707/E17.135, 715, 741, 763, 769, 771, 707/778, 797, 798, 752, 957, 999.001, 707/999.1, 791
See application file for complete search history.

(56) References Cited

U.S. PATENT DOCUMENTS

| | | |
|---|---|---|
| 6,859,455 B1 | 2/2005 | Yazdani et al. |
| 7,167,856 B2 | 1/2007 | Lawder |
| 7,603,351 B2* | 10/2009 | Mansfield ............... G06F 16/36 |
| 8,055,687 B2 | 11/2011 | Zhang et al. |
| 8,688,723 B2* | 4/2014 | Zhang ................... G06F 16/245 707/758 |
| 2014/0164916 A1* | 6/2014 | Vasconcellos ........ G06F 40/103 715/249 |
| 2016/0179979 A1* | 6/2016 | Aasman ................ G06F 16/278 707/603 |

OTHER PUBLICATIONS

Lawder, J. K. and P. J. H. King, Using Space-Filling Curves for Multi-Dimensional Indexing. In: Lings, B. and K. Jeffrey (eds.), Proceedings of the 17th British National Conference on Databases (BNCOD 17), vol. 1832, ser. Lecture Notes in Computer Science, pp. 20-35, Springer Verlag, Jul. 2000.

Shah, A., A. Farooq, S. Ahsan, & M. Imran, An Indexing Technique for Web Ontologies, Journal of Computing, vol. 2, Iss. 7, Jul. 2010, ISSN 2151-9617.

R. J. Wroblewski, Semantic Indexing of Big Data Using a Hierarchical, Multidimensional Scheme, Int'l Conf. on Advances in Big Data Analytics, ABDA '14, Jul. 24, 2014.

* cited by examiner

METHOD FOR SEMANTIC INDEXING OF BIG DATA USING A MULTIDIMENSIONAL, HIERARCHICAL SCHEME

CROSS-REFERENCE TO RELATED APPLICATION

This application claims the benefit of prior U.S. Provisional Application No. 62/193,763, filed 17 Jul. 2015, titled "Method for Semantic Indexing of Big Data Using a Multidimensional, Hierarchical Scheme" (Navy Case #103095).

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 103095.

BACKGROUND OF THE INVENTION

The Resource Description Framework (RDF) was developed to capture semantic information of web and computer-stored objects to facilitate the transfer of this metadata. Although an RDF triple is referred to as subject/predicate/object (SPO), this is properly an object-name/attribute/value. However, this format is conveniently extended by many to the natural usage suggested by the SPO designation in the realm of real-world objects. Such triples are used to build social-networking graphs, to capture extracted metadata from unstructured text files, or to organize business analytics, to name a few instances. Data stores of these triples can quickly grow into billions of elements and become unwieldy to search or process. An improved process is needed to index such data stores.

SUMMARY

Disclosed herein is a method for indexing semantic, non-transitory, computer-stored data comprising the following steps. The first step provides for storing the data in a database. The next step provides for representing the data in a structured framework having at least three elements derived from an ontology. The next step provides for expressing each element as a hierarchical-index value based on an ontology such that semantic information is embedded therein. The next step provides for combining the elements in a multi-dimensional index. The next step provides for converting the multi-dimensional index into a one-dimensional index.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
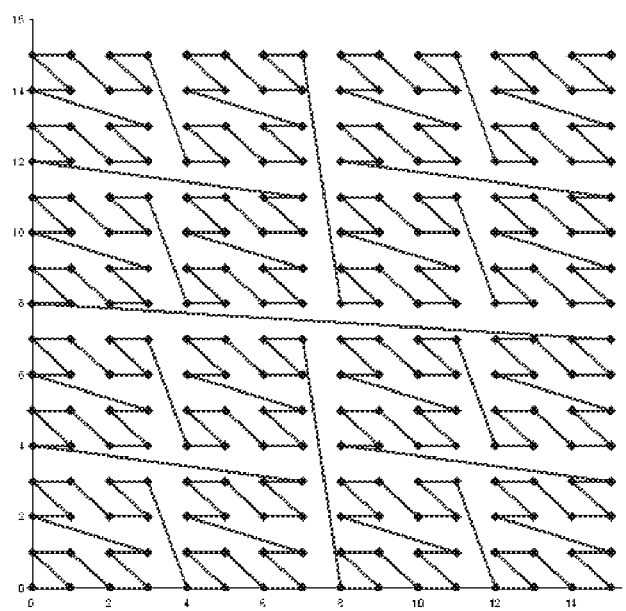
FIG. 1 is an illustration of a two-dimensional Z-order curve.

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Described herein is a method for semantic indexing of big data using a multidimensional, hierarchical scheme. The method for semantic indexing of big data using a multidimensional, hierarchical scheme may be described as combining multidimensional indexing with ontological information embedded in a Resource Description Framework (RDF) to form a semantic index, as well as extending this combination to include extra information, e.g. space-time tagging. Each RDF has at least three attributes such as a tuple. The disclosed method may be used to create a semantic index of data using RDF or RDF-like structures such as extended RDFs having four elements and generalized RDFs that have greater than four elements. The individual pieces of the RDF are encoded via a hierarchical indexing based on an ontology to embed semantic information. These pieces are then combined into a multi-dimensional index to form an efficient one-dimensional index. This scheme can be further extended to include auxiliary information such as space-time tagging in a second multi-dimensional step to embed the when and where of the semantic content.

A one-dimensional index created from multiple RDF components embedding semantic information and optionally including auxiliary information provides significant efficiency for retrieving data from big-data stores. The RDF was developed to capture semantic information of web and computer-stored objects to facilitate the transfer of this metadata. Although an RDF triple is referred to as subject/predicate/object (SPO), this is properly an object-name/attribute/value. However, this format is conveniently extended by many to the natural usage suggested by the SPO designation in the realm of real-world objects. Typical big-data databases are NoSQL-based using some form of a key/value design for storage. Efficient search and retrieval of this data is facilitated by an efficient indexing key.

A typical way to achieve this is merging multiple keys into a single indexing key. Often these multidimensional indexes are formed with the support of space-filling curves. That is, a curve that maps discrete points spanning an n-dimensional volume into a one-dimensional series. Common examples are Z-order curves, Hilbert curves, and Gray-code curves. Roughly, the efficiency of using multidimensional indexing comes from the feature that things that are close in some sense in n-dimensional space will then be close in the one-dimensional mapping, at least on average.

While efficient, such indexing doesn't fully capture the semantic content available. In particular, the RDF elements are generally constructed as elements derived from an ontology. The hierarchical structure of the ontology (i.e. the taxonomy) expresses the core of the semantic information embedded in the ontology. A hierarchical-indexing scheme allows searching of all the children of a parent element at once. On the other hand, mixing the RDF elements into a key index in a structure-less way would require searching over all of the combinations of the sets of children of each of the elements to achieve the same result. Hence, merging ontology-based hierarchical-indexing with multidimensional indexing gives a workable and efficient semantic-indexing method.

Multidimensional Indexing:

There are any number of multidimensional-indexing designs available. A simple one is just concatenating the elements. A major drawback with this method is that it is strongly biased toward the first dimensions in searches and not particularly efficient for more than three or so dimensions. Principally, this is because the "closeness" of later dimensions is limited by needing to index through all the elements of the previous dimensions before incrementing.

A simple mitigation for this problem is to interleave the elements at a more atomistic level—characters or digits for example. Although still biased towards the earlier dimensions, reducing the span of the dimensions improves the closeness criteria, particularly for the later dimensions. Taking this to the limit involves representing each dimensional element in binary format and interleaving the bits. This is often called Z-order indexing. FIG. 1 illustrates the two-dimensional Z-order "curve" as it discretely spans an area defined by x,y ∋ Int[0,15].

Hierarchical Indexing:

The quintessential hierarchical-indexing system example is outline numbering. Hierarchical implies a tiered structure, i.e. parent/child relationships. Furthermore, we also need a uniqueness condition enforced between siblings. Indexing implies that the unique siblings are also ordered. That is, they can be sorted.

To create a semantic index, we need to express each element of the RDF as a hierarchical-index value and then combine the three in a multidimensional index. For this to be effective though, it is important that the tiers of the hierarchical index "line up" over all instances and across the dimensions. So, we are lead to using finite-category formatting for the tiers. Finite-category is formally restrictive in terms of span and sorting that, once implemented, makes it difficult to modify or extend with new information. In practice though, one can choose a large span with lots of "reserved for future use" elements between the currently defined ones.

For illustration, one could choose 10-bit numbers represented by two base-32 characters allowing for 1024 elements for each tier. However, it is to be understood that the forgoing is provided for illustration purposes only and that the semantic indexing method disclosed herein is not limited to 10-bit numbers represented by two base-32 characters. This would allow for a relatively compact index while providing reasonable flexibility to modify. Each tier could have a different bit size provided the tiers can be lined up. Powers-of-two sizings may be chosen to help searches straddle bit boundaries. This is believed to add some efficiency to the index, by exploiting the sparsity of the taxonomy in index space.

The previous description describes semantic indexing over RDF triples. This can be extended to cover quads and beyond that are in common use by adding another dimension. Often temporal and/or geolocation tags are important in RDF searches. It is a simple matter to extend the above scheme to include these.

Specifically, one could create a multidimensional index for the spatial or space-time tag in addition to the RDF semantic index. Then the two can be blended together with a second multidimensional step. Searches can then proceed not only over the semantic content but also over the when and where using an efficient one-dimensional index. An example of sequential multidimensional steps is as follows:

first make a multidimensional index out of x,y,z,t→I(x,y,z,t); then make a multidimensional index out of I(RDF) and I(x,y,z,t). Further details and examples may be found in the article "Semantic Indexing of Big Data Using a Hierarchical, Multidimensional Scheme," by Wroblewski, R., submitted for ABDA 2014 International Conference on Advances in Big Data Analytics, WorldComp 2014, Las Vegas, 2014 Jul. 21-24, which article is incorporated by reference herein in its entirety.

An efficient one-dimensional index for retrieving RDFs from big-data stores improves the efficiency of analytic-processing systems dependent upon such retrieves. Current technology stores the individual RDF components separately in relational databases, which have scaling issues going to big data. Crude concatenations of RDF components is more efficient, but not nearly as much as bit-level interleaving and lacks embedded semantic content. Furthermore, no other method allows efficient merging with auxiliary information, such as space-time tagging.

Multiple methods for multidimensional indexing may be used. The ones using space-filling curves (Z-order a.k.a Morton; Hilbert; Gray code; etc.) are generally more efficient. Hierarchical indexing could be fashioned as a B-Tree type of index, but would result in giving up aligning tiers between instances and RDF dimensions, making for a 'mushier', but probably still viable, semantic index.

Semantic information can be captured after a fashion in the form of RDF triples or quads. Often these triple or quad stores can be billions of statements or more. Having thus passed into the realm of "big data", there is an acute need for efficient methods of searching these stores to extract subgraphs for processing. The claimed method takes advantage of multidimensional indexing schemes combined with a hierarchical (i.e. semantic) ordering to form a semantic index.

In two dimensions, the transform proceeds as follows: The pair of integers is converted into binary representations. Then the two are combined into a single number by interleaving the digits such that the lowest significant digits of each are consecutive, then the next, etc. The resultant representation can be expressed in a high base, 32 in this case, for a more compact index. As the mapping is one-to-one, this is a reversible operation. By incrementing the index by one, one steps to the next point along the curve. Viz:

$$105_{10} => 1.1.0.1.0.0.1._2$$
$$70_{10} => .1.0.0.0.1.1.0_2$$
$$1 1 1 0 0 0 1 0 0 1 0 1 1 0_2 => e4m_{32}$$
$$(105.70) => e4m$$

This is easily generalized to N dimensions. Here's a four-dimensional example:

$$105_{10} => 1\ldots1\ldots0\ldots1\ldots0\ldots0\ldots1\ldots_2$$
$$70_{10} => .1\ldots0\ldots0\ldots0\ldots1\ldots1\ldots0._2$$
$$84_{10} => \;.1\ldots0\ldots1\ldots0\ldots1\ldots0\ldots0._2$$
$$99_{10} => \;\;..1\ldots0\ldots0\ldots0\ldots1\ldots1\ldots0_2$$
$$1 1 1 1 1 0 0 0 0 0 1 0 1 0 0 0 0 1 1 1 0 1 0 1 1 0 0 0_2 => 7o5lqo_{32}$$
$$(105.70, 84.99) => 7o5lqo$$

The reversal process is literally just reading these examples from bottom to top. That is, represent the index in binary format and de-interleave the digits over the number of dimensions. Finally, reconstruct the representation of the component in the desired base, 10 in this case.

A feature of the Z-order curve is that every other step along the curve maps to a greater-than-minimum step in the n-dimensional space. In fact, the jumps at these bit boundaries can be arbitrarily large. (Hilbert curves overcome this, but at the cost of more complexity in computing the index.) This issue manifests itself when searching. Unless a search box exactly straddles bit boundaries in each dimension, the run of the Z-order curve that fully covers the search box will also contain values from outside the box, sometimes in significant numbers. The solution is to partition the search box along the bit boundaries, starting with the highest-order boundary in each dimension. The exact solution is likely to lead to a surfeit of short-count runs of the Z-order index. Fortunately, an optimally efficient solution is generally obtained with just a couple of partitionings, especially in light of typical buffer sizes of retrieves in distributed big-data stores. (E.g. 64 MB) That is, partition along the highest-order boundary for each dimension and maybe the next, retrieve based on those Z-index runs, and filter the excess retrieves with map-reduce tasks. One can partition the search box to reduce false positives. In the extreme case of doing no partitioning before the other steps, using a very sparse taxonomy may be nearly as efficient as performing partitioning.

the set of positive integers. You may add as many items as you wish, but you may not arbitrarily sort them into the existing set. Yet another subcategory is the double-sided unbounded set, where you may add items to either end, with the same sorting restrictions.

The principal distinction between these two is that the latter requires an extra bit of information for representation. On the other hand is the DSC, where you may arbitrarily insert items between others without affecting the span between existing items. Examples include the set of fractions spanning the finite range, [0 1), or a binary tree. Table 1 summarizes these.

A hierarchical index then is just the product space of one or more of these classes. As such, it is also a form of multidimensional indexing. However, unlike the previous design, the tiering is important, that is, we want to keep the dimensional bias. As shown in the table, examples include things like the Dewey Decimal system (or floating-point numbers in general), quadtrees, dates and times, and of course, taxonomies.

In principle, separators are not needed for hybrids consisting solely of $CAT_F$ patterns, or with at most one of $CAT_1$, $CAT_2$, or DSC. However, they are useful for readability and implicit typing.

TABLE 1

| Hierarchical Indexing. | | | |
|---|---|---|---|
| Rank 1 | | | |
| | Categories | | Finite step size |
| $CAT_F$ | Finite | [A .. Z] | a-priori knowledge (no adds) |
| $CAT_1$ | Infinite (1-sided) | [1, 2, . . ., ∞) | Unlimited, but unsorted adds |
| $CAT_2$ | Infinite (2-sided) | (−∞. . . −2, −1] ⊕ [0] ⊕ [1, 2, . . ., ∞) | |
| | Discretely Sampled Continuum | | Finite range, e.g. [0, 1) |
| DSC | | [0, .5, .25, .75, .125, .375, . . .] | Unlimited, sorted adds (Binary and B-Trees) |
| Rank 2 | | | |
| Hybrid | | | |
| $CAT_1 \otimes DSC$ | | E.g. Dewey Decimal | Unlimited range, unlimited stepping |
| $DSC \otimes DSC$ | | E.g. Quadtree | |
| Rank n | | | |
| Other Hybrids | | | |
| $CAT_1 \otimes CAT_F \otimes CAT_F$ | | E.g. Dates | Sep. 10, 2013 |
| $CAT_F \otimes CAT_F \otimes CAT_F \otimes DSC$ | | E.g. Times | 19:42:23.56 |
| $CAT_F \otimes CAT_F \otimes CAT_F \otimes CAT_F$ | | E.g. IPv4 addresses | 129.0.0.1 |
| $CAT_1 \otimes CAT_1 \otimes \ldots \otimes CAT_1$ | | E.g. Outline | 1.A.2.b.5 |
| $CAT_1 \otimes CAT_1 \otimes \ldots \otimes CAT_1$ | | E.g. Taxonomy | Thing.Agent.Person.Male |

There are a few classes of sibling sets in the hierarchical indexing system that can be distinguished, falling into two broad types. One type has a finite "step" size, but is potentially unbounded in range. This type will be referred to hereafter as "Categories." The other type is finite in range, but has potentially limitless resolution. This type will be referred to hereafter as "Discretely Sampled Continuum" (DSC).

The Categories can be further subdivided. A Category with a finite number of elements is one. Examples of this are the set of letters or alphanumeric characters. This implies an a-priori knowledge of the categorical span. Adding another item to the set will disturb the ordering; items on one side of the add are now a different number of steps away from those on the other side.

Allowing adds only to the end of the set leads to another subcategory, a single-sided unbounded set. An example is To create a semantic index, we need to express each element of the RDF as a hierarchical-index value and then combine the three in a multidimensional index. For this to be effective though, it is important that the tiers of the hierarchical index "line up" over all instances and across the dimensions. So, we are lead to using $CAT_F$ formatting for the tiers. As previously discussed, $CAT_F$ is formally restrictive in terms of span and sorting that, once implemented, makes it difficult to modify or extend with new information. In practice though, we can choose a large span with lots of "reserved for future use" elements between our currently defined ones.

As discussed above, one could choose 10-bit numbers represented by two base-32 characters allowing for 1024 elements for each tier, which would allow for a relatively compact index while providing reasonable flexibility to modify. Powers-of-two sizings may be chosen to help searches straddle bit boundaries.

To demonstrate semantic indexing, we have fashioned a simulation. A sample taxonomy was created and used in generating a large batch of random RDFs. Table 2 shows a subset of this taxonomy. The indexing uses the illustrative 10-bit system described above.

TABLE 2

Subset of a Sample Taxonomy.

| Index | Term |
|---|---|
| 01 | Relation |
| 0101 | SameAs |
| 01G1 | Contains |
| ... | |
| 21 | Action |
| 2101 | Move |
| 210101 | Walk |
| 210141 | Run |
| ... | |
| 2141 | Use |
| 2181 | Communicate |
| 21K1 | Transact |
| 21K1c1 | TransferMoney |
| 21K1G1 | Donate |
| ... | ... |
| C1 | Agent |
| c101 | Person |
| c10101 | Professional |
| c101A1 | GroupLeader |
| c101c1 | PersonOfInterest |
| ... | |
| c1G1 | Organization |
| ... | |
| G1 | Location |
| G141 | Space-time |
| G14181 | LatLonAltTime |
| ... | |
| G1M1 | SpotFeature |
| G1M161 | School |
| G1M1c1 | Business |
| G1M1c101 | CoffeeShop |
| G1M1c141 | RetailShop |
| ... | |
| K1 | Structure |
| K101 | Building |
| ... | |

Figure 2:
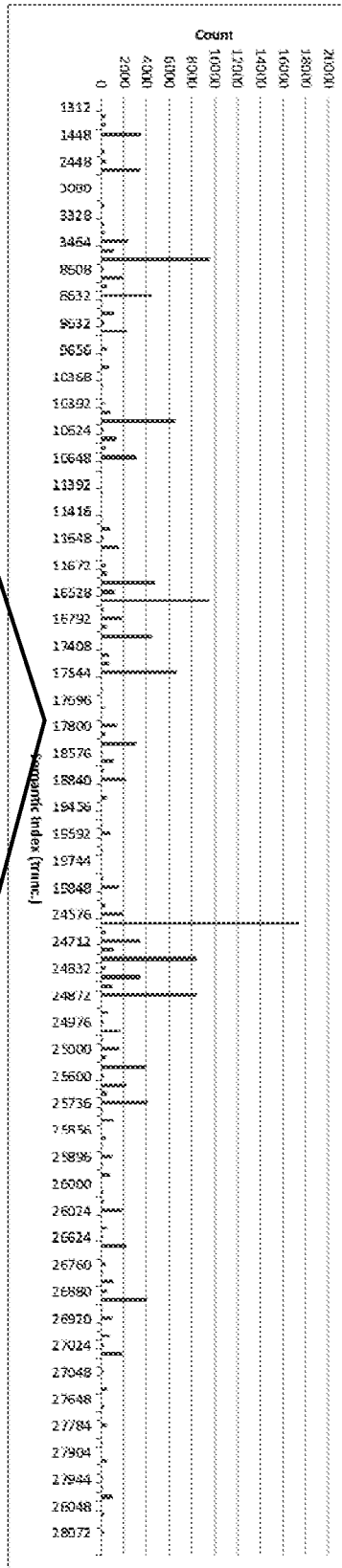
FIG. 2 is a plot of information.

FIG. 2 presents the results of the simulation. The plot shows the distribution of the semantic-index values. Although the randomization of the RDF was based on a uniform distribution, the taxonomy had varying numbers of children for parents and as well as for the number of tiers. This results in a non-uniform index distribution.

The left side of FIG. 2 breaks out a small segment of the index to examine details. The broken-out segment is an upper-level triple, Agent/Transact/Weapon. As we move down the list towards higher indexes, we find related triples with one or more of the SPO items at lower levels. For example: Merchant/Trade/Weapon and Person/Purchase/Bomb. Only about half of the labels are displayed to avoid unreadable overlaps, but all of the triples in this segment are within the Agent/Transact/Weapon triple hierarchy. That is, no other random triple encodes to an index within this range.

Because the simulation used created triples randomly based on the taxonomy, many of them are nonsensical in content. However, they do group together throughout the span of the indexing based on their hierarchical positioning similar to the example shown above. The exceptions come at the major bit boundaries, which can be effectively handled by the search-partitioning method described above.

The claimed method may be used to create an index to encode the semantic information contained in RDF triples. This consists of creating a hierarchical index, based on an ontology, for each element of the triple. Then these dimensions may then be combined using a multidimensional-indexing method. An embodiment of the claimed method was exercised using a sample ontology to randomly generate RDF triples as described above. As expected, upon detailed inspection of the indexing we find that semantically related triples encode closely.

The importance of this result is in facilitating efficient searches over large stores of triples. The "closeness" feature for semantic relatedness in the index allows for dramatically reducing the fraction of the database needed to be retrieved during a search. The inexactness of "closeness" requires some filtering of excess retrieves. But the extent of these can be mitigated with the search method and the design of the indexing.

Figure 3:
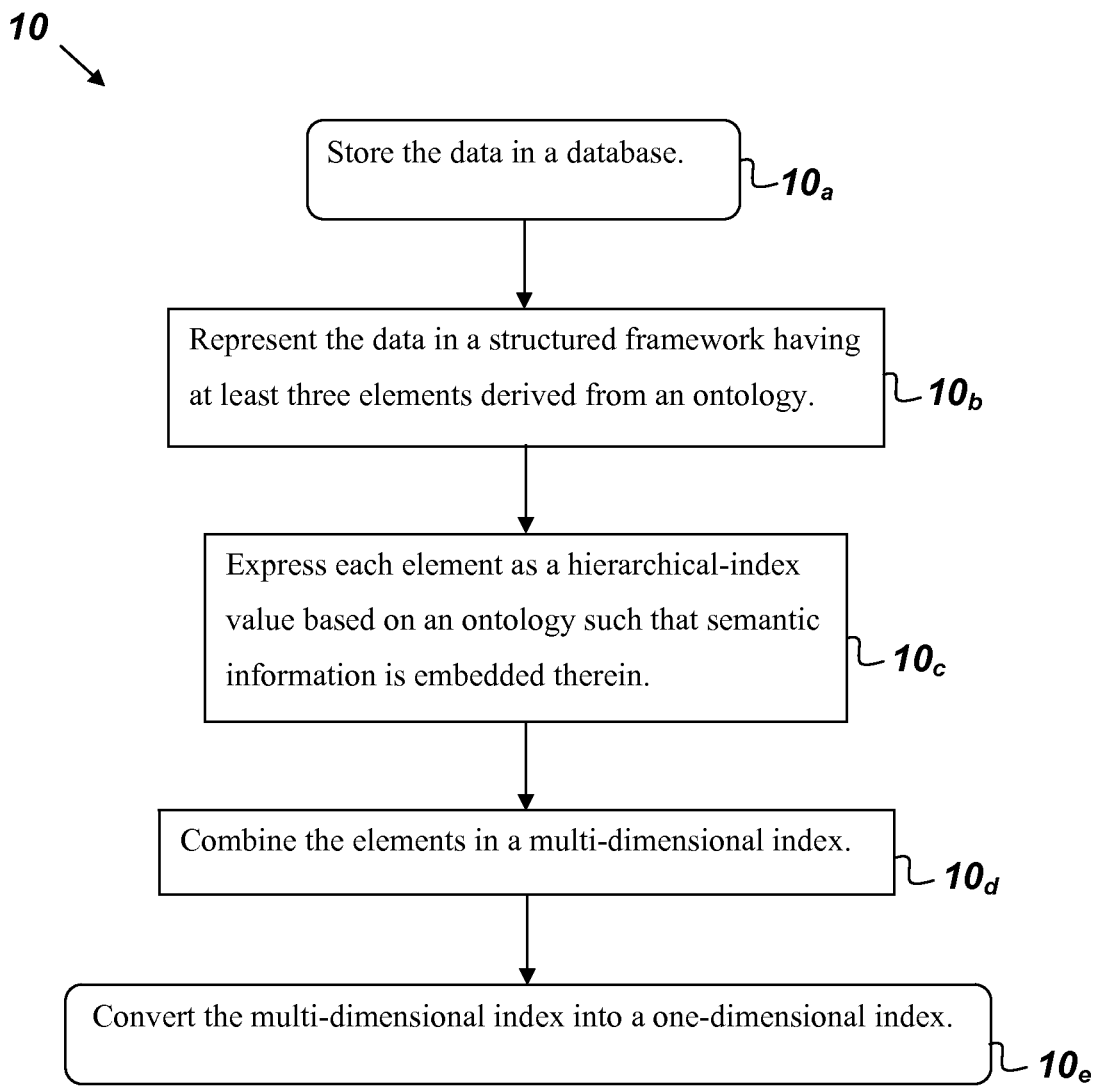
FIG. 3 is a flowchart of a method for semantic indexing of big data using a multidimensional, hierarchical scheme.

FIG. 3 is a flowchart of a method 10 for semantic indexing of big data using a multidimensional, hierarchical scheme. The first step $10_a$ provides for storing the data in a database. The next step $10_b$ provides for representing the data in a structured framework having at least three elements derived from an ontology. The next step $10_c$ provides for expressing each element as a hierarchical-index value based on an ontology such that semantic information is embedded therein. The next step $10_d$ provides for combining the elements in a multi-dimensional index. The next step $10_e$ provides for converting the multi-dimensional index into a one-dimensional index.

From the above description of the Method for Semantic Indexing of Big Data Using a Multidimensional, Hierarchical Scheme, it is manifest that various techniques may be used for implementing the concepts of the method without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the method is not limited to the particular embodiments described herein, but is capable of many embodiments without departing from the scope of the claims.

I claim:

1. A method performed by a computer for creating a semantic, hierarchical index for a big-data database, wherein the big-data database stores billions of Resource Description Framework (RDF)-like statements, wherein the RDF-like statements each comprise at least three elements derived from a taxonomy, the method comprising the following steps;

embedding semantic information into each RDF-like statement by expressing each element of the RDF-like statement as a hierarchical-index value based on the taxonomy from most general to more specific, such that each element fits within a corresponding tier of a hierarchical index;

lining up the tiers of the hierarchical index by grouping together elements in the same tier at an atomistic level such that the tiers of the hierarchical index line up over all instances and such that semantically similar elements are close together such that searches on more general parent elements will simultaneously retrieve more specific children elements; and using multidimensional indexing to combine the elements of each RDF-like statement by using a space-filling curve that reversibly maps discrete points spanning an n-dimensional volume in order to form a one-dimensional index such that, on average, elements that are semantically close in n-dimensional space will be spatially close in the one-dimensional index thereby forming a semantic index which enables efficient search and retrieval of RDF-like statements having similar semantic content from a fraction of the big-data database without searching the entire database.

2. The method of claim 1, further comprising using finite-category formatting to line up tiers of the hierarchical index by grouping together elements in the same tier at an atomistic level.

3. The method of claim 2, wherein each tier comprises reserved space between currently defined elements.

4. The method of claim 3, wherein each tier comprises 1024 elements.

5. The method of claim 1, wherein the space-filling curves are Z-order space-filling curves.

6. The method of claim 1, wherein the one-dimensional index comprises dimensional elements that are represented in binary format.

\* \* \* \* \*